United States Patent
Zhang (10) Patent No.: US 9,255,504 B2
(45) Date of Patent: Feb. 9, 2016

(54) EXHAUST GAS MIXER AND SYSTEM

(71) Applicant: Ford Global Technologies, LLC, Dearborn, MI (US)

(72) Inventor: Xiaogang Zhang, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 13/969,239

(22) Filed: Aug. 16, 2013

(65) Prior Publication Data

US 2015/0047330 A1 Feb. 19, 2015

(51) Int. Cl.
*F01N 3/02* (2006.01)
*F01N 3/28* (2006.01)
*F01N 13/20* (2010.01)

(52) U.S. Cl.
CPC .. *F01N 3/02* (2013.01); *F01N 3/28* (2013.01); *F01N 13/20* (2013.01); *F01N 2240/20* (2013.01); *Y02T 10/47* (2013.01)

(58) Field of Classification Search
CPC ........... F01N 3/2892; F01N 3/10; F01N 3/28; F01N 3/208; F01N 3/02; F01N 13/20; F01N 2240/20; B01F 5/0616; B01F 3/04007; B01D 53/92; F02B 31/00; Y02T 10/47
USPC .................. 60/272–324; 366/337; 29/888.01; 423/212; 261/74, 87; 123/306, 590
See application file for complete search history.

(56) References Cited

U.S. PATENT DOCUMENTS

| | | | |
|---|---|---|---|
| 5,261,743 A * | 11/1993 | Moller | 366/196 |
| 7,497,138 B2 | 3/2009 | Kubinski et al. | |
| 8,225,648 B2 | 7/2012 | Nelson | |
| 8,359,832 B2 | 1/2013 | Yi et al. | |
| 8,745,978 B2 * | 6/2014 | Vanvolsem et al. | 60/324 |
| 2003/0226539 A1* | 12/2003 | Kim | 123/306 |
| 2004/0050040 A1* | 3/2004 | Berriman et al. | 60/324 |
| 2009/0266064 A1* | 10/2009 | Zheng et al. | 60/317 |
| 2011/0259290 A1* | 10/2011 | Michikawauchi et al. | 123/1 A |
| 2012/0180457 A1 | 7/2012 | Liu et al. | |
| 2013/0118148 A1 | 5/2013 | Zhang | |
| 2013/0125533 A1 | 5/2013 | Sullivan et al. | |

FOREIGN PATENT DOCUMENTS

DE 102010056314 A1 * 6/2012
DE 102010056314 A1 * 6/2012

OTHER PUBLICATIONS

DE 102010056314 A1 Translation, Michael Fischer, Device for Distributing Fluids in Exhaust Systems, Jun. 28, 2012.*

* cited by examiner

*Primary Examiner* — Jesse Bogue
*Assistant Examiner* — Kelsey Stanek
(74) *Attorney, Agent, or Firm* — Julia Voutyras; Alleman Hall McCoy Russell & Tuttle LLP (57) ABSTRACT

A device and a system are provided. The system may include a perforated barrier disposed within an exhaust stream downstream from the combustion chamber(s). The barrier may divide the exhaust stream radially and longitudinally. A mixing surface may be coupled with the perforated barrier which may define a path within the exhaust stream to impart a swirl to the exhaust stream.

19 Claims, 6 Drawing Sheets

EXHAUST GAS MIXER AND SYSTEM

TECHNICAL FIELD

The present application relates to a device and a system for mixing exhaust gas having a perforated wall and one or more surfaces to impart at least a partial swirl to an exhaust flow.

BACKGROUND AND SUMMARY

A diesel particulate filter (DPF) may be used to remove diesel particulate matter or soot from the exhaust gas of a diesel engine. A soot sensor may be located downstream from the DPF and may be configured to determine whether or not a soot concentration in the exhaust gas is within acceptable levels.

The inventors herein have recognized examples wherein the soot sensor reading may not represent the actual average soot concentration. For example many DPF cracks may originate close to the DPF circumference area of the exhaust conduit. Accordingly, the concentration of soot closer to the conduit center may be lower than average levels, and higher than average levels at near the conduit circumference. In addition, many applications require that the on board diagnostic soot sensor be located a short distance downstream from the DPF exit cone where soot distribution is usually very poor due to a lack of distance for adequate soot particulates redistribution. The soot sensor may extend into, for example, a three to four inch exhaust pipe diameter only about one inch.

Efforts have been made to provide better exhaust stream soot concentration readings. For example, U.S. Pat. No. 8,225,648 provides a particulate matter sensor for sensing particulate matter present in exhaust gases in a conduit which attempts to solve the problem of undesirable spikes in the output signal of the particulate matter sensor which may be caused when large particles impinge upon the electrodes of the sensor. The disclosed device provides an inner shield surrounding a sensing face and an inner shield inlet passage for admitting exhaust gases to be sensed. The inner shield also has an exit passage to allow exhaust gases to exit. An outer shield surrounds a portion of the inner shield to define an outer shield chamber that extends axially beyond the inner shield and includes an outer shield inlet passage for communicating exhaust gases into the outer shield chamber from the upstream end of the exhaust conduit. Exhaust gases enter the inner shield from the outer shield inlet chamber.

The inventors of the present application have recognized a number of problems with the above approach. For example, the disclosed attempt appears to simply change the location within the exhaust conduit from which the exhaust gas is sampled. The disclosed attempt does not, however, provide a sample of exhaust which better represents the overall concentration of soot in the exhaust stream.

The inventors herein provide a system including a perforated barrier disposed within an exhaust stream downstream from the engine cylinder(s). The perforated barrier may divide the exhaust stream radially and longitudinally. The system may also include a mixing surface coupled with the perforated barrier. The mixing surface may define a path within the exhaust stream to impart a swirl to the exhaust stream. In this way, any soot that may be in the exhaust stream may be better mixed into the exhaust stream to provide a more homogeneous mixture. In this way, the soot sensor may provide a more accurate reading of the amount of soot that may be present in the exhaust stream. Using both flow impingement and swirling together may tend to improve flow mixing, and may provide improved performance with less pressure loss.

The perforated barrier may have a circumferential edge in substantial sealing engagement with an inner diameter wall of an exhaust conduit. The barrier may define a surface which extends upstream from the circumferential edge while extending in a radial direction from the inner diameter wall. In this way, as exhaust gas flows across the barrier it may enter a region between the circumferential edge of the exhaust conduit and the barrier outer surface. The barrier may divide the exhaust conduit into two parts, and consequently two exhaust flow paths, an upstream path and a downstream path. Flow in upstream path may pass through the perforated holes on the perforated barrier to exit to the downstream path. Since the perforated holes may be located at circumference of the barrier surface, the flow direction may be significantly pointed toward the center line of exhaust conduit. The mixing surface coupled with the perforated barrier may create a swirling flow. As flow enters the region between exhaust conduit and cone outer surface area, it may follow the curve of the mixing surface and flow rotation may be generated before it passes through the perforated holes. As the flow exits from perforated holes, the swirling momentum may carry on inside the perforated barrier and help flow mixing. With those two flow mechanisms, soot particulates may be more uniformly distributed downstream of the perforated barrier forming an effective soot mixer. In this way, the soot sensor can detect soot leakage within short distance from the DPF.

Embodiments may provide a system including a conduit for passing a stream of exhaust from a combustion chamber of an internal combustion engine. An exhaust gas sensor may be located within the conduit. A wall may be located within the conduit upstream from the exhaust gas sensor. The shape of the wall may at least approximate a cone and may have an upstream portion with a first outer diameter and a downstream portion with a second outer diameter. The second outer diameter may be larger than the first outer diameter. A plurality of passages may be in the wall. One or more edges may be coupled with the wall and may extending axially and radially within the conduit. In this way the edges may impart at least a partial swirl to the flow of exhaust, and the configuration of the wall and the plurality of passages may tend to intermix relatively upstream exhaust with relatively downstream exhaust. In this way the exhaust may be more thoroughly mixed even a relatively short distance from the DPF.

Various embodiments may provide a system including a circular exhaust pipe having a perforated bell housing with an open end of the bell facing downstream. A plurality of fins may extend helically around an outer surface of the perforated bell. In this way, soot that may be present in the exhaust stream may be more homogenously mixed into the exhaust stream which may provide a more accurate exhaust sample to be sensed by the soot sensor.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
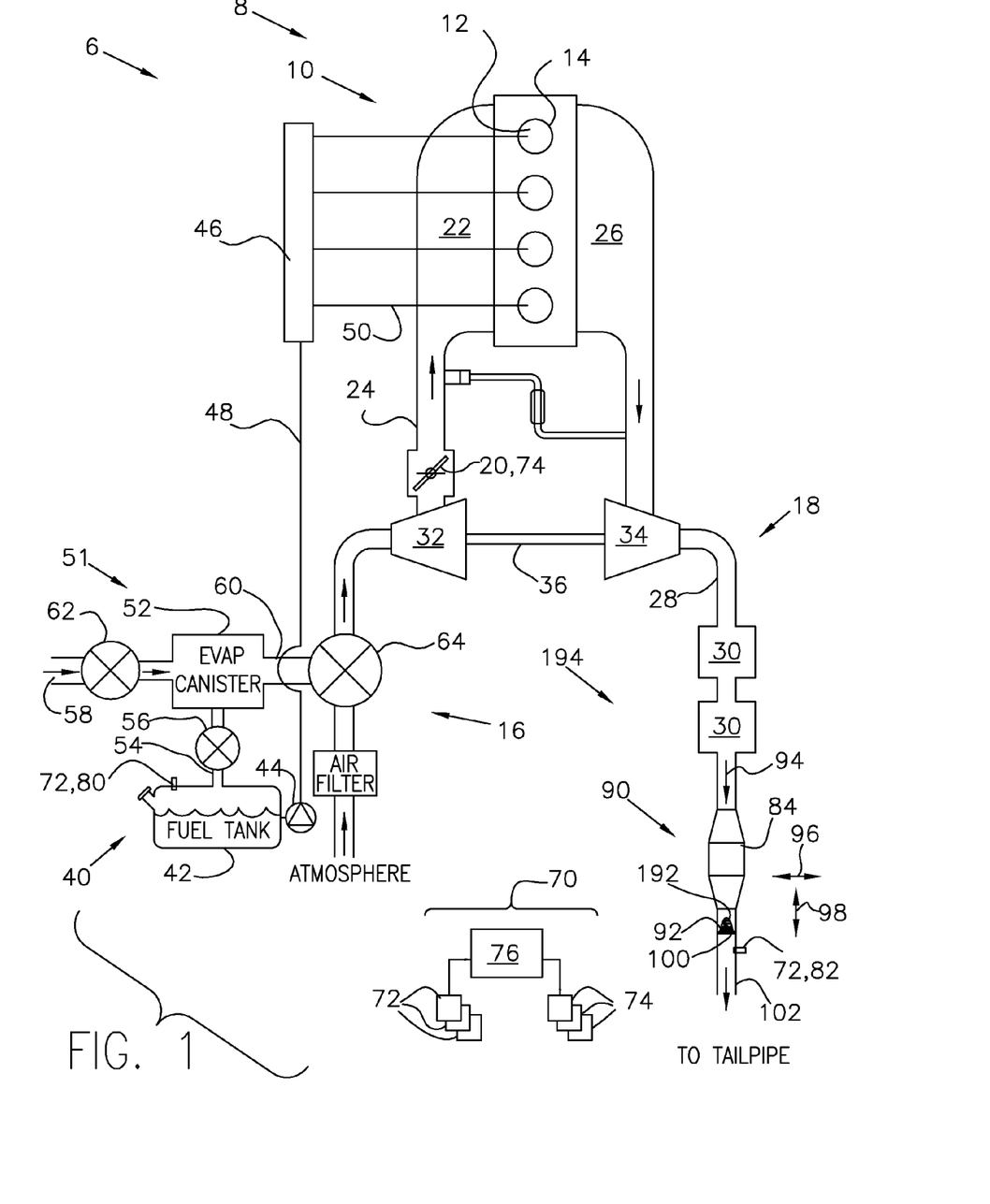
FIG. 1 illustrates a schematic depiction of an engine system including an example exhaust gas mixing system in accordance with the present disclosure.

FIG. 1 shows a schematic depiction of a vehicle system 6. The vehicle system 6 includes an engine system 8. The engine system 8 may include an engine 10 having a plurality of cylinders 12 defining a respective plurality of combustion chambers 14. The engine 10 may include an engine intake 16 and an engine exhaust 18. The engine intake 16 may include a throttle 20 fluidly coupled to an engine intake manifold 22 via an intake passage 24 to regular intake air flow. The engine exhaust 18 may include an exhaust manifold 26 leading to an exhaust passage 28 that routes exhaust gas to the atmosphere via a tailpipe. The engine exhaust 18 may include one or more emission control devices 30, which may be mounted in a close-coupled position in the exhaust. The one or more emission control devices may include a three-way catalyst, lean NOx trap, diesel particulate filter, oxidation catalyst, etc. It will be appreciated that other components may be included in the engine such as a variety of valves and sensors.

The engine intake 16 may further include a boosting device, such as a compressor 32. Compressor 32 may be configured to draw in intake air at atmospheric air pressure and boost it to a higher pressure. The boosting device may be a compressor 32 of a turbocharger, wherein the boosted air may be introduced pre-throttle. The compressor 32 may be part of a supercharger. The throttle 20 may instead be positioned before the compressor 32. Using the boosted intake air, a boosted engine operation may be performed. The compressor 32 may be driven by a turbine 34 coupled with the compressor 32 with a shaft 36.

The engine system 8 may include a fuel system 40 which may include a fuel tank 42. The fuel system 40 may include one or more pumps 44 for pressurizing fuel delivered to a fuel rail 46 via a mail fuel line 48. The fuel may then pass to the combustion chambers 14 of the engine 10 via respective fuel lines 50.

Vapors generated in fuel system 40 may be routed to a fuel vapor recovery system 51 that may include a fuel vapor canister 52 via conduit 54, to be purged via the engine intake passage 24. Among other functions, fuel tank isolation valve 56 may allow the fuel vapor canister 52 of the fuel vapor recovery system to be maintained at a low pressure or vacuum without increasing the fuel evaporation rate from the tank (which would otherwise occur if the fuel tank pressure were lowered.

The fuel vapor canister 52 may be filled with an appropriate adsorbent. The vapor canister 52 may be configured to temporarily trap fuel vapors (including vaporized hydrocarbons) during fuel tank refilling operations and "running loss" (that is, fuel vaporized during vehicle operation). In one example, the adsorbent used may be activated charcoal. Vent 58 may also allow fresh air to be drawn into fuel vapor canister 52 when purging stored fuel vapors from fuel system 40 to the intake passage 24 via purge line 60 and purge valve 62. A canister vent valve 64 may also be included in purge line 60 to prevent (boosted) intake manifold pressure from flowing gases into the purge line in the reverse direction. While this example shows vent 58 communicating with fresh, unheated air, various modifications may also be used. Flow of air and vapors between fuel vapor recovery system 51 and the atmosphere may be regulated by the operation of a canister vent solenoid (not shown), coupled to canister vent valve 64.

The vehicle system 6 may further include control system 70. Control system 70 is shown receiving information from a plurality of sensors 72 and sending control signals to a plurality of actuators 74. Example, sensors 72 may include pressure, temperature, air/fuel ratio, and composition sensors which may be coupled to various locations in the vehicle system 6. One example actuator 74 may include the throttle 20. The control system 70 may include a controller 76. The controller 76 may receive input data from the various sensors 72, process the input data, and trigger the actuators 74 in response to the processed input data based on instruction or code programmed therein corresponding to one or more routines.

One example sensor 72 may include a fuel tank pressure sensor 80, or fuel tank pressure transducer (FTPT). The fuel tank pressure sensor 80 may be included with, or coupled with the fuel tank 42, as shown, or may be included between the fuel tank 42 and/or fuel vapor canister 52, to provide an estimate of a fuel tank pressure, and for engine-off leak detection. The fuel tank pressure sensor 80 may alternately be located in conduit 54, purge line 60, or vent 58.

Another example sensor 72 may be a soot sensor 82 that may be located downstream from, for example, a diesel particulate filter 84 disposed on the exhaust passage 28. The soot sensor 82 may be operatively coupled with the controller 76, as described to communicate a level of soot present within the exhaust stream. The soot level may be communicated to, for example, a user readable output.

Various embodiments may include various systems for handling, and/or managing the soot levels. Some examples may include a system 90 that may include a perforated barrier 92 disposed within an exhaust stream 94 downstream of the engine cylinder(s) 12. The perforated barrier 92 may divide the exhaust stream radially 96 and longitudinally 98. The system 90 may also include a mixing surface 100, or a mixing edge, coupled with the perforated barrier 92. The mixing surface 100, or mixing edge, may define a path within the exhaust stream 94 to impart a swirl to the exhaust stream. In this way, any soot that may be in the exhaust stream 94 may be better mixed into the exhaust stream 94 in a more homogeneous mixture. In this way, the soot sensor 82 may provide a more accurate reading of the amount of soot that may be present, even when located relatively close to the DPF.

Figure 2:
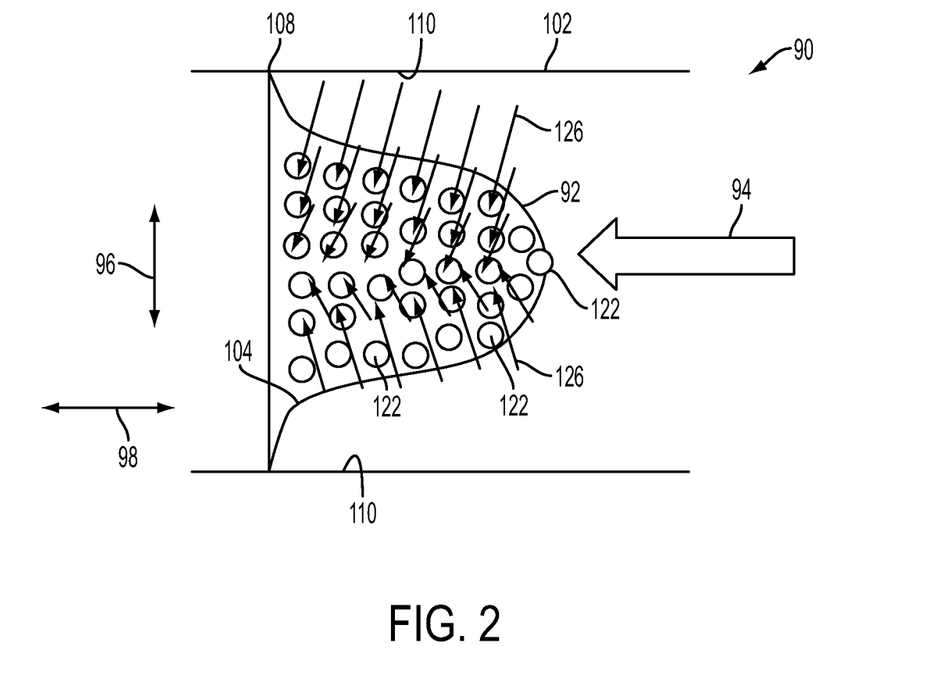
FIG. 2 is a partial sectional side view of an example embodiment that may be used with the engine system illustrate in FIG. 1.

FIG. 2 is a partial sectional side view of an example perforated barrier 92 that may be disposed within exhaust conduit 102. FIG. 2 shows an example wherein the perforated barrier 92 may be wall 104 having a plurality of holes 122. The wall 104 may have a circumferential edge 108 in substantial sealing engagement with an inner diameter wall 110 of the exhaust conduit 102. The perforated barrier 92 may define a surface which extends upstream from the circumferential edge 108 while extending in a radial direction from the inner diameter wall 110.

Figure 3:
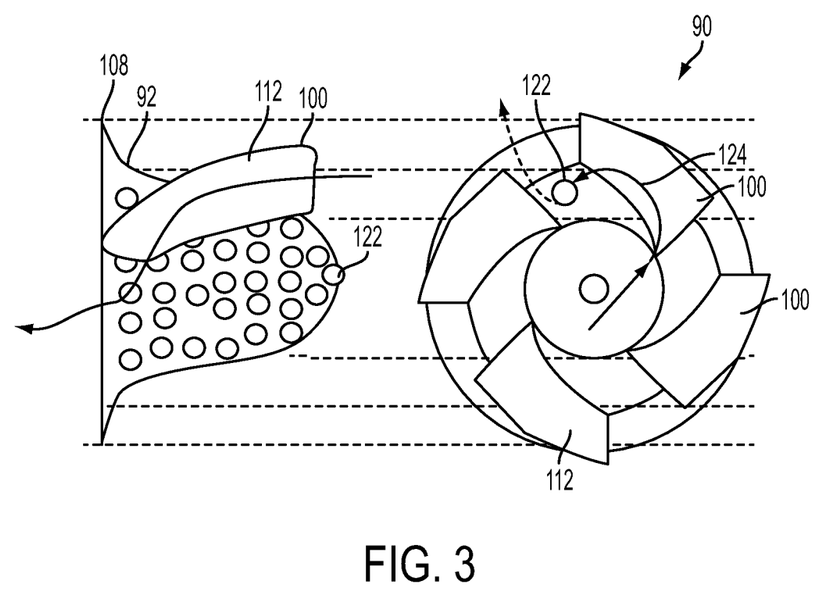
FIG. 3 is a combined side view and end view illustrating example additional features of the example embodiment illustrate in FIG. 2.

FIG. 3 is a combined side view and end view illustrating example additional features of the system 90. In the illustrated example the mixing surface 100 is included on a vane 112 coupled with the perforated barrier 92. The mixing surface may be located on a contoured surface made integrally with the perforated barrier 92.

Figure 4:
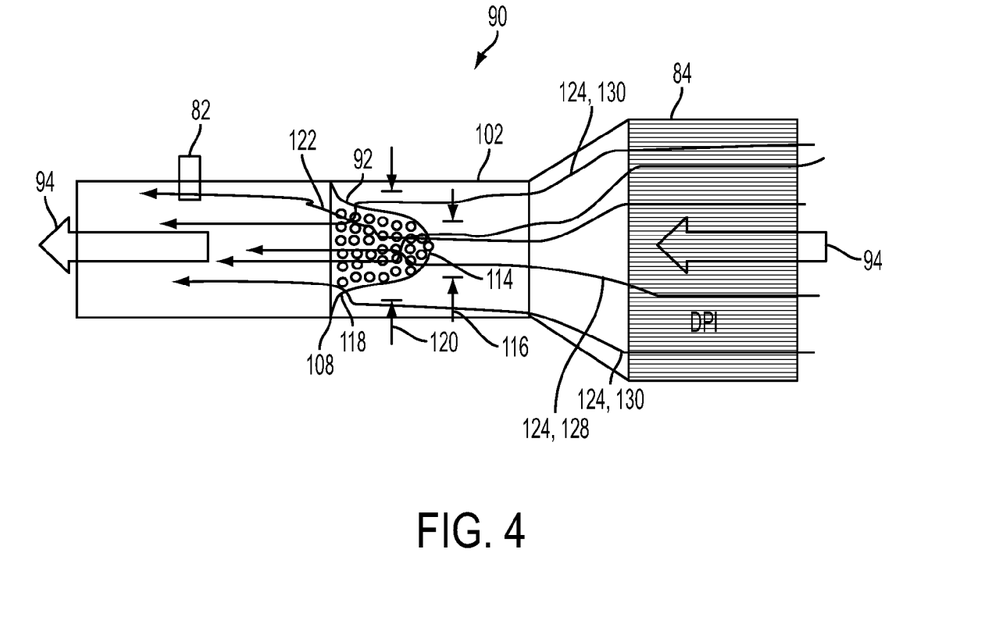
FIG. 4 is a schematic side view of the embodiment illustrate in FIG. 3 disposed within the exhaust conduit in relative example positioning with a diesel particulate filter DPF and a soot sensor.

FIG. 4 is a schematic side view illustrating the perforated barrier 92 disposed within the exhaust conduit 102 in relative example positioning with a diesel particulate filter (DPF) 84 and a soot sensor 82. As shown the perforated barrier 92 may be located upstream from an exhaust or soot sensor 82, and downstream from the DPF 84.

Some example embodiments may provide a system 90 including a conduit 102 for passing a stream of exhaust, or exhaust stream 94, from a combustion chamber 14 of an internal combustion to an engine 10. An exhaust gas sensor, and/or a soot sensor 82 may be located within the conduit 102. A wall 104 may be located within the conduit 102 upstream from the exhaust gas sensor 82. The wall 104 may at least approximate a cone and may have an upstream portion 114 with a first outer diameter 116 and a downstream portion 118 with a second outer diameter 120. The second outer diameter 120 may be larger than the first outer diameter 116. A plurality of passages 122 may be formed in the wall. There may be one or more surfaces 100 coupled with the wall 104 that may extend axially and radially within the conduit 102. FIGS. 3 and 4 illustrate example flow paths 124 through the conduit 102 effected at least partially by the geometry of the system 90, including the wall 104 and the surface 100. FIG. 2 illustrates example directions 126 in a substantially radial direction of the flow paths 124 through the plurality of passages 122.

As exhaust gas may flows across the wall 104 it may enter a region between the inner diameter wall 110 of the exhaust conduit 102 and the wall 104 outer surface. The wall 104 may divide the exhaust conduit into two parts, an upstream part and a downstream part, and may consequently also divide the exhaust stream 94 in to two exhaust flow paths, an upstream path 128 and a downstream path 130. Flow in upstream path 128 may pass through the perforated holes 122 on the perforated barrier 92 to exit downstream relative to the downstream path 130. One the other hand, flow in downstream path 130 may pass through the perforated holes 122 on the perforated barrier 92 to exit upstream relative to the upstream path 128. In this way, more complete mixing may be provided.

Figure 5:
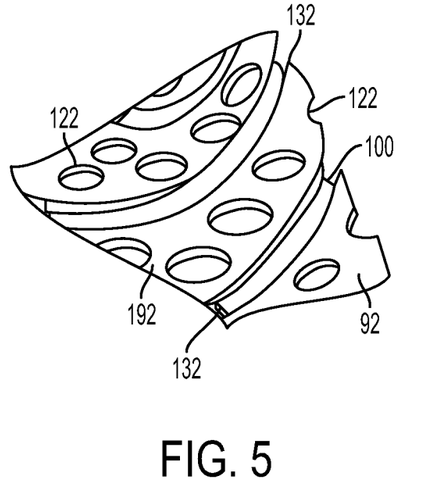
FIG. 5 illustrates another example embodiment in accordance with the present disclosure.
Figure 6:
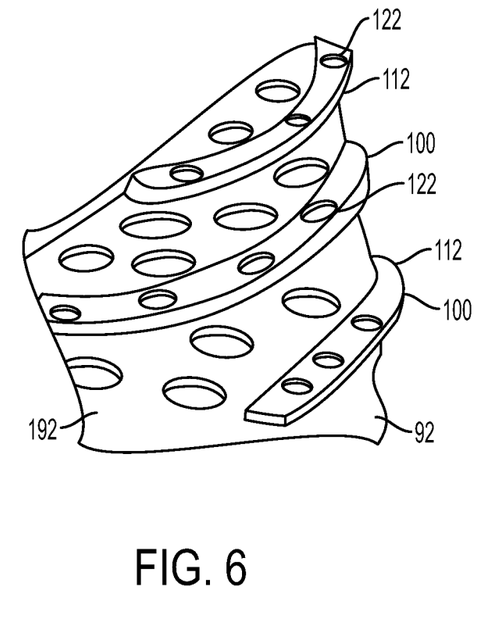
FIG. 6 illustrates yet another example embodiment in accordance with the present disclosure.

FIGS. 5 and 6 illustrate other example embodiments in accordance with the present disclosure. In some cases the plurality of passages 122 may be circular holes 122. FIGS. 2-4 illustrate examples wherein the plurality of passages 122 may be substantially the same size and shape, while FIGS. 5 and 6 illustrate examples wherein the plurality of passages 122 may be of two or more sizes and/or two or more shapes.

Some example embodiments may provide a system including a circular exhaust pipe 102 having a perforated barrier 92, which may be formed as perforated bell housing with an open end of the bell facing downstream. Accordingly the bell housing 92 may have a closed end of the bell facing upstream. A plurality of vanes 112, or fins 112, may extend helically around an outer surface of the perforated bell housing 92. The plurality of vanes 112, or fins 112, may include one or more surfaces 100 on the more curvilinear vanes. In some cases the plurality of vanes 112, or fins 112, may be continuous, while in other cases the plurality of vanes 112, or fins 112, may be discontinuous.

In some cases the bell housing 92, or wall 104, may be cone shaped. In other cases, the bell housing 92, or wall 104, may be bell shaped. In some cases the bell housing 92, or wall 104, may be frustoconically shaped.

FIG. 5 illustrates an example wherein the mixing surface 100 may be located in a groove 132 formed in the perforated barrier 92. FIG. 6 illustrates an example wherein the vanes 112, or fins 112, may be formed integrally with the bell housing 92 and wherein at least some of the openings 122 may be in the vanes 112, or fins 112 and allow at least some exhaust gas to pass through the vanes 112, or fins 112.

In some cases, the perforated bell housing 92 may have a substantially regular pattern of perforations 122, or holes 122 (FIGS. 2-4). In other cases, the perforated bell housing 92 may include a plurality of perforations 122, or holes 122 each being substantially the same size and shape.

Some example embodiments may provide a soot mixing device 192 for an exhaust system 194 for an internal combustion engine 10. The soot mixing device 192 may include a wall 104 for disposition within an exhaust stream 94. The wall 104 may have an upstream surface and a downstream surface. The wall 104 may extend radially across the exhaust stream 94 and longitudinally along the exhaust stream 94. The wall 104 may have an upstream outer diameter 116 and a downstream outer diameter 120. The downstream outer diameter 120 may be larger than the upstream outer diameter 116. There may be openings 122 in the wall 104 to allow the exhaust stream 94 to pass from an upstream side of the wall to a downstream side of the wall. The soot mixing device 192 may include one or more surfaces coupled with the 104 wall and angled relative to the exhaust stream 94 to impart at least a partial rotation to at least a portion of the exhaust stream 94.

It should be understood that the systems and methods described herein are exemplary in nature, and that these specific embodiments or examples are not to be considered in a limiting sense, because numerous variations are contemplated. For example, the above technology can be applied to V-6, I-4, I-6, V-12, opposed 4, and other engine types. Accordingly, the present disclosure includes all novel and non-obvious combinations of the various systems and methods disclosed herein, as well as any and all equivalents thereof.

The invention claimed is:

1. A system, comprising:
a perforated bell-shaped wall, where the bell-shaped wall is a continuous curved convex to concave surface, disposed within an exhaust stream downstream of an engine cylinder and dividing the exhaust stream radially and longitudinally; and
a swirl-shaped mixing surface coupled with and extending radially outward from an outer surface of the bell-shaped wall, the mixing surface defining a path within the exhaust stream to impart a swirl to the exhaust stream.

2. The system of claim 1, wherein the bell-shaped wall has a plurality of holes therein, the outer surface also having a circumferential edge in sealing engagement with an inner diameter wall of an exhaust conduit, wherein the perforated bell-shaped wall defines a surface which extends upstream from the circumferential edge while extending in a radial direction from the inner diameter wall, and wherein the mixing surface extends radially outward from a center of the exhaust conduit and toward the inner diameter wall of the exhaust conduit.

3. The system of claim 1, wherein the mixing surface is included on a vane coupled with the outer surface of the bell-shaped wall.

4. The system of claim 1, wherein the mixing surface is located on a contoured surface made integrally with the perforated bell-shaped wall.

5. The system of claim 1, wherein the mixing surface is located in a groove formed in the perforated bell-shaped wall.

6. The system of claim 1, wherein the perforated bell-shaped wall is located upstream from an exhaust gas sensor.

7. A system comprising:
a conduit for passing a stream of exhaust from a combustion chamber of an internal combustion engine;
an exhaust gas sensor located within the conduit;
a wall located within the conduit upstream from the exhaust gas sensor, the wall at least approximating a cone and having an upstream portion with a first outer diameter and a downstream portion with a second outer diameter, the second outer diameter being larger than the first outer diameter, the wall having an outer surface facing an inner diameter wall of the conduit and an inner surface facing a center line of the conduit;
one or more surfaces coupled with the wall extending outward from the outer surface of the wall, toward an upstream end and the inner diameter wall of the conduit, axially and radially within the conduit; and
a plurality of passages in the wall and between the surfaces, wherein the wall is bell shaped having a continuous curved convex to concave surface.

8. The system of claim 7, wherein the plurality of passages are positioned in the wall and between each of the surfaces and wherein the plurality of passages are circular holes.

9. The system of claim 7, wherein the plurality of passages are the same size and shape.

10. The system of claim 7, wherein the plurality of passages are of two or more sizes and/or two or more shapes.

11. The system of claim 7, wherein the one or more surfaces are on one or more curvilinear vanes coupled along an edge of the surface to the wall forming a helical flow path for exhaust gas.

12. The system of claim 7, wherein the wall is cone shaped.

13. The system of claim 7, wherein the wall is frustoconically shaped.

14. A system, comprising:
a circular exhaust pipe having a perforated bell-shaped housing with an open end of the perforated bell-shaped housing facing downstream, the bell-shaped housing having a continuous curved convex to concave surface; and
a plurality of fins extending helically around an outer surface of the perforated bell-shaped housing and extending radially outward from the outer surface of the perforated bell-shaped housing and a center line of the exhaust pipe.

15. The system of claim 14, wherein the perforated bell-shaped housing is perforated with a number of openings and wherein the fins are formed integrally with the perforated bell-shaped housing and wherein at least some of the openings are in the fins and allow at least some exhaust gas to pass through the fins.

16. The system of claim 14, wherein the perforated bell-shaped housing has a regular pattern of perforations, the perforations positioned on the bell-shaped housing and between each of the fins and wherein the outer surface of the perforated bell-shaped housing faces an inner diameter wall of the exhaust pipe, the plurality of fins extending radially toward the inner diameter wall and extending axially upstream and outward from the outer surface.

17. The system of claim 14, wherein the perforated bell-shaped housing includes a plurality of perforations each of the same size and shape, the perforations positioned on the bell-shaped housing and between the fins.

18. The system of claim 14, wherein the plurality of fins are continuous.

19. The system of claim 14, wherein the plurality of fins are discontinuous.

* * * * *